United States Patent [19]
Elias et al.

[11] Patent Number: 5,844,971
[45] Date of Patent: Dec. 1, 1998

[54] FORM CREATING AND ORDERING SYSTEM

[75] Inventors: Joseph Elias, Morris Plains; Susan Malinowsky, Hopatcong, both of N.J.

[73] Assignee: Citibank, N.A., New York, N.Y.

[21] Appl. No.: 575,675

[22] Filed: Dec. 18, 1995

[51] Int. Cl.$^6$ .............................. H04M 11/00; H04N 1/32
[52] U.S. Cl. ...................... 379/100.11; 358/403; 358/407
[58] Field of Search ................................ 379/100, 96–98, 379/67, 88, 100.01, 100.03, 100.05–100.09, 100.11–100.13, 100.17, 93.17, 93.25, 93.26, 93.28, 67.1, 88.01; 358/400, 402, 403, 405, 407, 434–436, 438, 442, 443, 468

[56] References Cited

U.S. PATENT DOCUMENTS

| | | | |
|---|---|---|---|
| Re. 34,429 | 11/1993 | Baran et al. | 379/100 |
| 3,920,895 | 11/1975 | Vieri et al. | 178/26 |
| 3,920,896 | 11/1975 | Bishop et al. | 178/26 |
| 3,958,088 | 5/1976 | Vieri | 178/26 |
| 4,918,722 | 4/1990 | Duehren et al. | 379/100 |
| 4,974,254 | 11/1990 | Perine et al. | 379/100 |
| 5,068,888 | 11/1991 | Scherk et al. | 379/100 |
| 5,072,309 | 12/1991 | Brown | 358/434 |
| 5,136,634 | 8/1992 | Rae et al. | 379/100 |
| 5,196,943 | 3/1993 | Hersee et al. | 379/100 |
| 5,231,510 | 7/1993 | Worthington | 358/400 |
| 5,267,303 | 11/1993 | Johnson et al. | 379/100 |
| 5,341,222 | 8/1994 | Newman et al. | 358/403 |

FOREIGN PATENT DOCUMENTS

| | | | |
|---|---|---|---|
| 0459 793 A1 | 4/1991 | European Pat. Off. | |
| 2 211 698 | 7/1989 | United Kingdom | 379/98 |

OTHER PUBLICATIONS

"Faxfacts®, Automated Information Retrieval by Fax/Voice" brochure, copia International LTD., Sep. 8, 1994.

*Primary Examiner*—Wing F. Chan
*Attorney, Agent, or Firm*—Foley, Hoag & Eliot LLP

[57] ABSTRACT

A form creation and ordering system allows for creation and editing of forms, receives telephone calls placed by users, prompts the users to indicate between one and a predetermined number of desired forms, prompts the users to indicate a selected mode of delivery, and provides the desired forms to the users via the selected mode of delivery. The system may also uniquely identify each of the users by providing identification information, receive user profile data that varies according to the identification information, prompt the users to indicate whether the desired forms should be customized prior to being provided to the users, and customize the desired forms by adding customized user information in response to the users indicating that the desired forms should be customized prior to the forms being provided to the users.

36 Claims, 9 Drawing Sheets

FORM CREATING AND ORDERING SYSTEM

TECHNICAL FIELD

This application relates to the field of providing preprinted forms and more particularly to the field of using telephone and computer systems to create and deliver forms to users.

BACKGROUND OF THE INVENTION

Preprinted forms provide a mechanism for organizations to obtain specific information from users. In addition, preprinted forms allow the collection of that information in a uniform and standardized manner. An organization, such as a health care provider, provides preprinted forms with a plurality of blank portions and with text indicating the requested information. The user writes the requested information in the blank portions of the form.

Managing and providing a variety of different forms for a large number of users can be very labor intensive. The forms provider keeps a number of hard copy versions of each of the forms on hand to satisfy requests by users. Since the forms may be printed off site, it is necessary to always maintain a substantial stock of forms in order to be able to respond to expected requests. If the lead time for printing the forms is say, one week, then the forms provider must keep on hand at least one week's supply of hard copies to provide to users. In addition, when one or more of the preprinted forms are changed by the forms provider, it is necessary to either discard the existing stock of old forms and build up a stock of the new forms or to wait until the existing stock of old forms is completely depleted before using the new forms. Discarding existing forms is wasteful and waiting to deplete old forms before replacing the old forms with new forms can cause undesirable delays in using the new forms. Furthermore, if the forms are kept in a single centralized location, then users that require forms must either go to that location to retrieve the forms or the forms provider must deliver the forms to the users.

The forms system described above is relatively expensive to operate since it requires many people to handle production, storage, and distribution of the forms. Also, when forms are modified, the forms management system described above can experience undesirable delays due to lead times in providing new forms to the forms distribution location and delays in providing forms to the user. In addition, there may be multiple sources for creation, production, storage, and distribution, thus further complicating the process and adding delays. It is desirable to have a more efficient and less labor intensive system for managing forms.

One way to handle forms is to allow users to request specific forms by telephone. The users dial a particular telephone number and either speak to a live operator or leave a recording that is later played back by an operator. The operator collects the forms requested by the users and mails the forms to the user. An example of such a system is the Internal Revenue Service's forms ordering hotline.

While the telephone ordering system described above is more convenient for the users than having to pick up the forms at a centralized forms location, it requires that the forms provider maintain a telephone hotline having operators for speaking to the users or playing back recordings of the user's calls. In addition, since the operators only have access to forms that have been previously printed, it is necessary for the forms provider to replace the hard copy forms whenever the forms provider changes the forms. Also, the telephone ordering system does not address the lead time deficiencies associated with form changes, and does not address the problems associated with maintaining an inventory of hard copies of the forms or the disposition of this inventory when forms are changed.

It is desirable, therefore, to more fully automate form handling and to provide for rapid turnaround when forms are changed by the forms provider. Various system for handling and delivering documents/data are disclosed in the prior art. However, none of those system specifically address all of the problems with form handling discussed above. A discussion of some of the prior art systems is given below:

U.S. Pat. No. 4,918,722 to Duehren et al. (the '722 patent) discloses a system in which a user can control delivery of binary encoded character data or facsimile encoded data to a specified recipient by a method in which DTMF encoded delivery commands, sent by the user, are received and then responded to by delivering the data to the specified recipient. FIGS. 3 and 4 show the general system which is described in Column 4, Lines 23–60. In addition, FIGS. 5 and 6 and Column 4, Line 61 through Column 5, Line 31 also disclose a similar information delivery system. Note that in the '722 patent, it is contemplated that the system fetches and delivers a record of data from a database.

U.S. Pat. No. 4,974,254 to Perine et al. (the '254 patent) discloses an interactive data retrieval system for producing facsimile reports. The system shown in FIG. 3 and described in Column 3, Line 60 through Column 4, Line 2 prompts the caller to input his or her subscriber ID number, account number, and optionally a security code. The text of the '254 patent also indicates that information requests may be provided to the caller several times in order to refine the caller's search request. Furthermore, Column 4, Lines 3–37 indicates that the system is directed primarily to locating data sets requested by the user. Column 10, Lines 42–44 indicate that the system can provide any type of data. FIGS. 9 and 10 of the '254 patent show the system being used for ordering goods.

U.S. Pat. No. 5,068,888 to Scherk et al. (the '888 patent) is directed to an interactive facsimile information retrieval system and method. Column 3, Lines 22–23 indicate that the stored documents that are provided to the user can be figures, text, or any combination thereof. Column 3, Lines 26–28 indicate that the prompts provided to the user for providing information can be voice prompts or computer screen display prompts. Column 6, Lines 16–18 disclose the use of a user password. Column 21, beginning at Line 7 discloses using the system to create customized bills.

U.S. Pat. No. 5,072,309 to Brown (the '309 patent) discloses an information retrieval arrangement including a facsimile apparatus. The system can be accessed by typing characters on a PC or by dialing a sequence of touchtone signals. In response to input from the user, the information is presented to the customer via the PC display, fax, or, as indicated in Line 49 of Column 1, by any of a number of alternative means. In addition, the system provides the user with a means for requesting particular types of information using a retrieve feature menu fax message wherein the user is sent a form listing the types of information available and then fills in one of the appropriate boxes on the right-hand side to request specific information. This is shown in FIG. 4 and described in Column 5, Lines 13–24 of the '309 patent.

U.S. Pat. No. Re-issue 34,429 to Baran et al. (the '429 patent) discloses an interactive facsimile system and method of information retrieval. FIG. 2(g) shows a response card that can be filled out by a user. FIG. 2(g) is described in Column 8. Line 58 through Column 9, Line 12. Column 10, Lines 50–64 indicate a feature where the user can send back an address which is stored and subsequently forwarded and used later.

None of the systems described above address all of the deficiencies associated with prior art form creating and ordering systems. It is desirable to have a form system that minimizes human intervention, minimizes turnaround time for modifying forms, and provides a convenient and reliable way for forms to be provided to the users.

SUMMARY OF THE INVENTION

According to the present invention, a form creation and ordering system allows for creation and editing of forms, receives telephone calls placed by users, prompts the users to indicate between one and a predetermined number of desired forms, prompts the users to indicate a selected mode of delivery, and provides the desired forms to the users via the selected mode of delivery. The system may also uniquely identify each of the users by providing identification information, receive user profile data that varies according to the identification information, prompt the users to indicate whether the desired forms should be customized prior to being provided to the users, and customize the desired forms in response to the users indicating that the desired forms should be customized prior to the forms being provided to the users. Customizing the desired forms may include adding user specific information to the desired forms.

In the form creation and ordering system, the selected mode may be either a faxing mode for faxing the desired forms to the users or a mailing mode for mailing the desired forms to the users. The taxing mode may be either a first faxing submode for faxing the desired forms immediately or a second faxing submode for faxing the desired forms at a predetermined time, such as midnight, Eastern Standard Time. The predetermined number of desired forms may vary according to the selected mode. For example, the predetermined number may be six for the mailing mode and may be three for the faxing mode.

Form creation and editing may be provided by a form generation engine implemented using a processor and form generation software. Also, a scanner may be used. The telephone calls may be received by a security processor. Prompting may be provided by an IVR processor. The forms may be provided to the user by a fax server and a printer.

By coupling creation and editing with providing the forms to the users, the system facilitates quick turn around of form changes. Allowing the user to select a mode of delivery (faxing or mailing) and to delay faxing provides flexibility not found in systems that can only deliver the forms to the users via a single mode. In addition, varying the maximum number of allowable forms according to the mode of delivery prevents overuse of the faxing facility of the system while still allowing the user to order a larger number of forms if having the forms mailed is acceptable to the user. Customizing the forms with user information makes it easier for users to fill out the forms since the system has already provided at least some of the information. This can be especially helpful to users who must fill out many forms. Using the scanner facilitates form creation by eliminating the need to construct every form from scratch. Providing the user with an option to delay facsimile transmission can take advantage of less expensive late night telephone rates, allow for receipt of forms on a fax machine that is busy during business hours but relatively free late at night, and eliminate the need for a user to wait at the fax machine for immediate delivery of the faxed material.

DETAILED DESCRIPTION OF THE PREFERRED EMBODIMENTS

Figure 1:
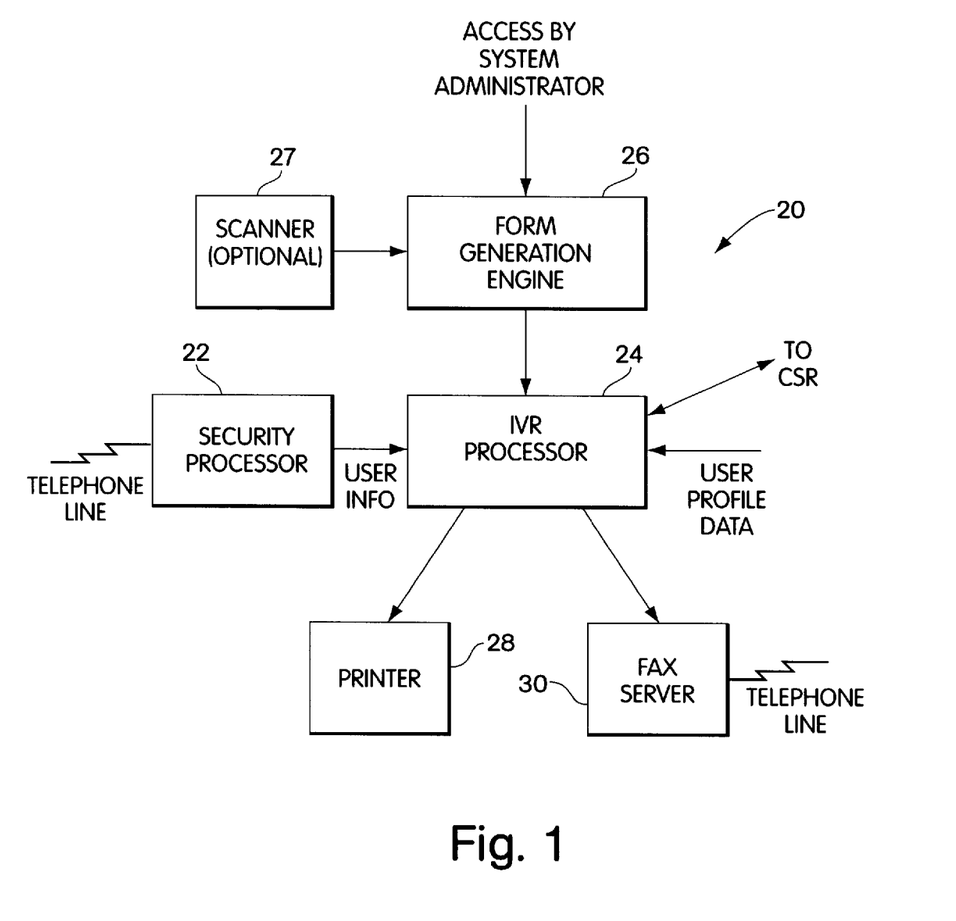
FIG. 1 is a schematic diagram of a form creating and ordering system according to the present invention.

Referring to FIG. 1, a form creating and ordering system 20 includes a security processor 22, an IVR (Interactive Voice Response) processor 24, a form generation engine 26, an optional scanner 27, a printer 28, and a fax server 30. A user accesses the system 20 by placing a telephone call which is answered by the security processor 22 via the telephone line shown connected thereto. Although not shown in FIG. 1, it is possible to provide TT (text telephone) access to the system 20 by providing a TT operator at the connection between the telephone line and the security processor 22 or by configuring the security processor 22 and the IVR processor 24 to handle TT processing in an automated fashion, if that capability is provided by the manufacturer.

The security processor 22 is an automated system that prompts the user (via voice prompts) to enter an identification number or numbers in order to verify that the user is authorized the access the system 20. For example, the security processor 22 could prompt the user to enter the user's Social Security number and a PIN (personal identification number) that only the user knows. The user could enter this information via the keys of the user's touchtone telephone. The security processor 22 would then verify authorization by comparing the numbers entered by the user with a database of authorized users stored in the security processor 22. Note that it is possible to use a variety of conventional user identification means as an alternative to the Social Security number and PIN scheme discussed above. The security processor can be implemented using a conventional personal computer such as an Intel-based personal computer with 16 megabytes of RAM, a 75 megahertz microprocessor, and a 500 megabyte hard disk. In addition, the software that provides functionality for the security processor 22 could be any one of a variety of conventional, commercially available, security/telephone interface software/hardware packages that are familiar to one of ordinary skill in the art.

The security processor 22 can be implemented such that human intervention is not necessary even when a user has forgotten his or her PIN number. In that case, the security processor 22 can prompt the user to enter numeric personalized information that only the user should know (such as the user's mother's date of birth). The security processor 22 could then compare the entered information with user information stored in the database of the security processor 22 and first collected when the user was signed up to use the system 20. If the entered information matches the database information, the user is issued a new PIN by the security processor 22. The security processor 22 can randomly prompt the user for different types of information in each instance.

The security processor 22 is connected via a conventional data link to the IVR processor 24. Once the security processor 22 verifies that the user placing the telephone call is authorized to access the system 20, then the security processor 22 passes the user information on to the IVR processor 24 by conventional means in order to allow the user to begin ordering forms. Once the user information is passed to the IVR processor 24, the IVR processor handles the remainder of the user's call. The IVR processor 24 can be implemented using hardware and software packages provided by a variety of vendors such as Intervoice, Edify, Talx, Periphonics, Perception Technology, et cetera. These off-the-shelf hardware and software packages come with all the hardware and software needed to implement the functionality described below in connection with FIG.'s 2–9. In addition, although not shown in FIG.'s 2–9, the IVR processor 24 can be provided by the manufacturer with an option for connecting to a CSR (Customer Service Representative), a live operator that can answer any questions the user may have or provide assistance to the user. The CSR can be invoked by the IVR processor 24 when the user presses a "0" key.

A conventional digital data connection is provided between the form generation engine 26 and the IVR processor 24. The form generation engine 26 is used by a system administrator to create and edit the forms that are ordered by the users. The form generation engine 26 can be implemented with an Intel-based personal computer running Windows with eight megabytes of RAM and 12 megabytes of free hard disk space. Form generation software, such as Jetforms software provided by Jetforms Corporation of Ottawa, Canada, is used to create and edit the forms. The form generation software allows the system administrator to create forms, edit the forms and store the forms in a digital data format suitable for providing to the users in the manner described in detail below. Furthermore, in addition to printing text on the forms, the form generation software allows the system administrator to specify that form information be presented on the forms in a variety of alternative manners, such as bar code format.

Optionally, a scanner 27 can be connected to the form generation engine 26 in a conventional manner to provide scanned digital images of pre-existing forms which the system administrator can then access and manipulate on the form generation engine 26 using the Jetforms software. The scanner 27 can be any one of a variety of conventional, commercially available, scanners that work with the Jetforms software such as the HP Scan Jet 4Si, UMAX Power 100K, Canon 1X-4015, et cetera.

The IVR processor 24 is connected to the printer 28 and the fax server 30 by a conventional digital data connection. The printer 28 is used to print out forms ordered by a user while the fax server 30 is used to fax forms to a user. The printer can be any one of a variety of commercially available printers such as the HewlettPackard LaserJet 4MV. The fax server 30 can also be any one of a variety of fax server systems such as a COMPAQ 9 personal computer containing rack-mounted multitext 28.8K baud modems and running Hayes Accura 28.8 software. The number of modems that are used with the fax server 30 depend on the expected number of callers. It has been found that twelve modems can handle up to five hundred average three-page faxes per day. The fax server 30 is connected to a telephone line.

The IVR processor 24 also receives user profile data by conventional data connection/transmission means, such as an RS-232 connection transmitting ASCII data. The user profile data includes data specific to each of the authorized users such as home address, age, and any other relevant information that can be maintained for each of the users. The user profile data is collected and maintained via any one of a variety of conventional database systems which are not part of the invention disclosed here and are not shown. The user profile data is used by the IVR processor 24 to customize user forms in a manner described in more detail below. Customization can be provided by a run time version of the Jetforms software that requests blank digitized forms from the form generation engine 26 and merges the user data therewith to create customized forms. The forms that are ordered by the user are then either printed on the printer 28 or faxed to the user by the fax server 30 according to the user's choice, as described in more detail below.

Although the security processor 22, the IVR processor 24, the form generation engine 26, and the fax server 30 are shown in FIG. 1 as separate units, it is possible to combine some or all of the units into a single unit. For example, depending on the volume of use of the system 20, it may be desirable to combine the security processor 22 and the IVR processor 24 into a single unit. Similarly, depending on the volume of use of the system 20, it may be desirable to provide the security processor 22, the IVR processor 24, the form generation engine 26, and the fax server 30 all into a single unit.

The following flow charts describe the steps used to implement and operate the system 20. The steps are programmed on the IVR processor 24 by conventional means using scripting and/or programming tools provided by the supplier of the IVR processor 24. For example, the Periphonics voice response unit, which can be used by one of ordinary skill in the art to implement the IVR processor 24, uses a scripting language, described in the Periphonics manuals, to provide the requested functionality.

Figure 2:
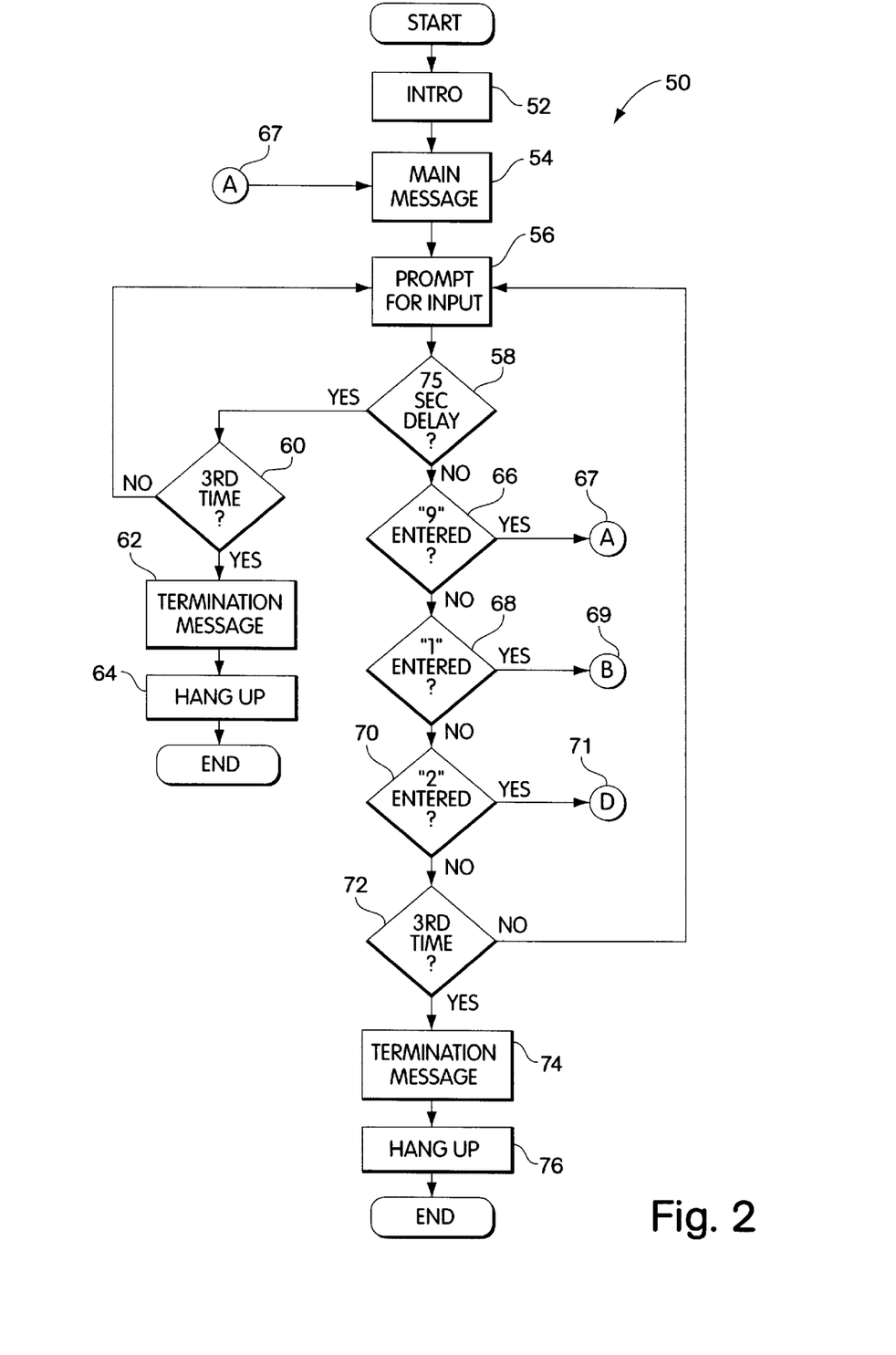
FIG. 2 is a flow chart that illustrates initial steps of a form creating and ordering system according to the present invention.

Referring to FIG. 2, a flow chart 50 illustrates initial steps of the form creating and ordering system 20. The flow chart 50 connects with other flow charts (shown in subsequent figures and described below) using off-page connectors labeled A, B, . . . The flow chart 50 combines with the other flow charts shown in subsequent figures to illustrate the entire operation of the system 20.

Processing begins at a first step 52 in which a user is provided with an introductory message. The message identifies the system and providing the user with general information regarding the service provided by the system 20. Note that the steps illustrated herein assume that prior to entering the system 20 and executing the first step 52, the user has already provided an identification number, such as a Social Security number, and has entered a personal identification number (PIN) used as a security code. This would be the case if the user entered the system 20 via another conventional telephone system (such as the security processor 22 of FIG. 1) which prompted the user to enter the Social Security code and PIN prior to connecting to the system 20.

It is also possible for the system 20 to be alternatively configured, in a conventional manner, so that the user can enter the system 20 by dialing in directly. In that case, the system 20 could prompt the user to enter their Social Security number and PIN at the step 52.

Following the step 52 is a step 54 where the user is provided with a main message indicating that the user can return to the main message step 54 at any time during operation of the system by pressing a "9" key on the user's touchtone telephone. Following the step 54 is a step 56 where the user is prompted to provide input indicating the user's choice of either ordering forms or ordering a forms catalog. The forms catalog is a list of available forms that shows the unique ordering number for each form. The prompt at the step 56 indicates that the user should press the "1" key on their touchtone telephone if the user desires to order forms and should press the "2" key on their touchtone telephone if the user desires to order a forms catalog.

Following the step 56 is a test step 58 which determines if there is a greater than five-second delay between the end of the prompt provided at the step 56 and the user pressing a key. If so, control transfers from the step 58 to a step 60 which determines if it is the third time that this has occurred. That is, at the step 60, a test is performed to determine if the user has delayed more than five seconds in entering a key at the step 58 three times. If so, control transfers from the step 60 back to the step 56 where the user is reprompted for input.

If at the step 60 the user has failed to provide any input after three prompts, then control transfers from the step 60 to a step 62 where the user is provided with a termination message indicating that the failure to provide input is causing the system 20 to disconnect. Following the step 62 is a step 64 where the system 20 hangs up the line. Following the step 64, processing for the system 20 is complete.

If at the step 58 the user provides an input in less than five seconds, then control transfers from the step 58 to a test step 66 to determine if the user has entered a "9" touchtone telephone key. As discussed above, the user is provided with a message at the step 54 indicating that the user can return at any time to the main message at the step 54 by pressing the "9" key. Accordingly, if it is determined at the step 66 that the user has pressed the "9" key, then control transfers from the step 66 back to the step 54 where the user is provided with the message associated with the step 54, as discussed above. Although not shown in the remainder of the flow charts, the user can transfer back to the main message step 54 at almost any point in the flow by entering the "9" touchtone key. Note also that transfer from the step 66 to the step 54 is illustrated using a connector "A" 67 which is also used as an off-page connector in subsequent flow charts.

If the user has not entered a "9" at the step 66, control transfers from the step 66 to a test step 68 to determine if the user has pressed the "1" key on their touchtone telephone. If so, then control transfers from the step 68 to another step in a subsequent figure, described below, indicated by an off-page connector "B" 69. Otherwise, if at the test step 68, the user has not entered the "1" key, then control transfers from the step 68 to a test step 70 to determine if the user has entered the "2" key on their touchtone telephone. If so, then control transfers from the test step 70 to additional steps in subsequent flow charts indicated by an off-page connector "D" 71.

If at the test step 70 it is determined that the user has not entered the "2" key, then control transfers from the test step 70 to a test step 72. Note that if the user reaches the test step 72, then the user has entered a key in less than five seconds (the test at the step 58) and has not entered a "9" key (the test at the step 66), has not entered a "1" key (the test at the step 68), and has not entered a "2" key (the test at the step 70). Since the only permissible inputs at this stage of the flow are the touchtone keys "9", "1", and "2", then the user reaches the test step 72 by having provided an impermissible input. At the test step 72, it is determined if the user has reached the step 72 a third time, thus indicating that the user has provided impermissible input in response to the prompt at the step 56 three times.

If it is determined at the step 72 that the user has provided impermissible input fewer than three times, then control transfers from the test step 72 back to the step 56 where the user is reprompted to enter appropriate input. Otherwise, if it is determined at the test step 72 that the user has entered impermissible input three times, then control transfers from the test step 72 to a step 74 where the user is provided with a termination message indicating that the user has not provided appropriate input and the system 20 will disconnect. Following the step 74 is a step 76 where the system 20 hangs up the connection to the user. Following the step 76, processing for the system 20 is complete.

Figure 3:
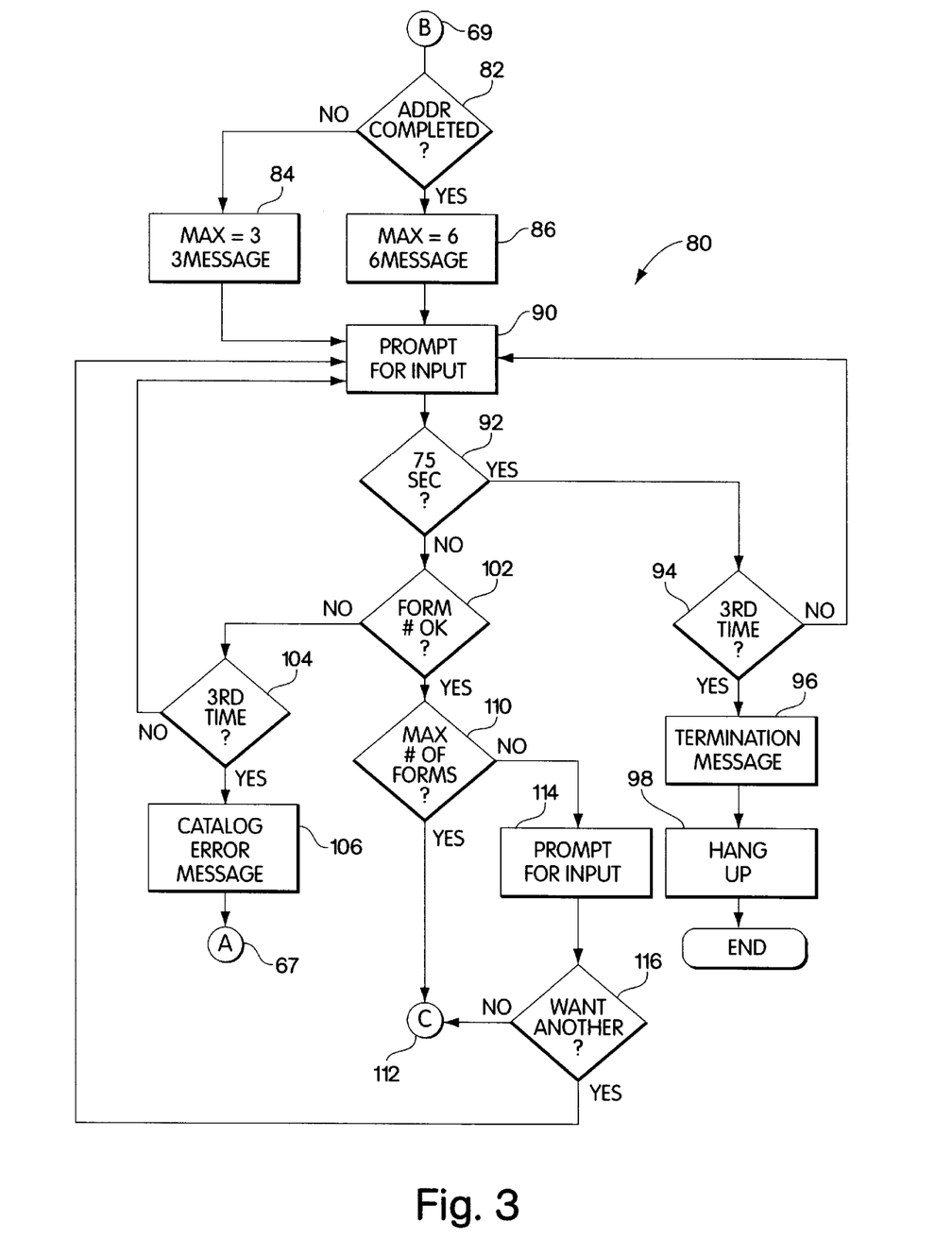
FIG. 3 is a flow chart illustrating requesting a form number from a user.

Referring to FIG. 3, a flow chart 80 illustrates continued processing from the off-page connector "B" 69 of FIG. 2. Processing continues from the location of the off-page connector "B" 69 of FIG. 1 to a test step 82 to determine if the user's mailing address, stored in the database, is complete. As described above, the system 20 stores a mailing address for each of the users that access the system 20. In some cases, it is possible for a user to be authorized to access the system 20 without the system 20 having the complete mailing address of the user stored in the database. In that case, the forms that are ordered by the user cannot be automatically mailed to the user but can only be faxed. Therefore, if at the test step 82 it is determined that the user's address is not complete, then control transfers from the test step 82 to a step 84 which sets the maximum number of forms that the user can order to three and provides the user with a message indicating that the user cannot order more than three forms since the forms are being faxed to the user. Otherwise, if it is determined at the test step 82 that the user's mailing address stored in the database is complete, then control transfers from the test step 82 to a step 86 which sets the maximum number of forms that the user can order to six and provides the user with an appropriate message. As described in more detail below, if the user in fact orders more than three forms, then the forms must be mailed to the user. In addition, irrespective of whether the user's mailing address stored in the database is complete, certain types of forms cannot be faxed to the user and must be mailed.

Following either the step 84 or the step 86 is a step 90 where the user is prompted to enter a three-digit form number. Note that although for the embodiment of the invention illustrated herein the forms are represented by three-digit numbers it is possible to use any number of digits or any combination of digits to identify specific ones of the forms.

Following the step 90 is a test step 92 which determines if the user has entered three form digits in less than five seconds. If not, then the user has delayed more than five seconds in entering a three-digit number and control transfers from the test step 92 to a test step 94 to determine if the user has delayed entering the form number more than three times. If not, then control transfers from the step 94 back to the step 90 to reprompt the user to enter the form number. Otherwise, if it is determined at the step 94 that the user has failed to enter the form number in a timely fashion three or more times, then control transfers from the step 94 to a step 96 where the user is provided with an appropriate termination message indicating that the system is disconnecting because the user has failed to provide the form number input. Following the step 96 is a step 98 where the system 20 hangs up the telephone. Processing is complete following the step 98.

If it is determined at the step 92 that the user has entered a three-digit number in less than five seconds, then control transfers from the step 92 to a test step 102 to determine if the user has entered a correct form number. The test step 102 involves a number of substeps which are shown in FIG. 4 and described in more detail in connection with the discussion of FIG. 4, below.

If it is determined at the test step 102 that the user has not entered a correct form number, then control transfers from the step 102 to a step 104 to determine if the user has failed three times to enter a correct form number. If not, then control transfers from the test step 104 back to the step 90 to reprompt the user to enter the three-digit form number. Otherwise, if it is determined at the test step 104 that the user has not entered a correct form number three times, then control transfers from the test step 104 to a step 106 where the user is provided with a message indicating that the user should order the forms catalog in order to receive information correlating available forms with particular three-digit form numbers. Following the step 106, control transfers back to the step 54 shown in FIG. 2 and described above. The flow from the step 106 to the step 54 is indicated by the connection from the step 106 to the off-page connector "A" 67.

If at the test step 102 it is determined that the user has entered a correct form number, then control transfers from the step 102 to a test step 110 to determine if the user has ordered the maximum number of allowable forms. As discussed above in connection with the steps 82, 84, 86, the maximum number of allowable forms that the user can order is six if the user's address stored in the database of the system 20 is complete so that the forms can be mailed to the user or three if the user's address is not complete and the forms must be faxed to the user. If it is determined at the step 110 that the user has ordered the maximum allowable number of forms, then control transfers from the step 110 to additional processing, shown in a subsequent figure and indicated in FIG. 3 by an off-page connector "C" 112. Otherwise, if it is determined at the test step 110 that the user has ordered less than the maximum allowable number of forms, then control transfers from the step 110 to a step 114 where the user is prompted to press the "1" touchtone telephone key if the user wishes to order an additional form. Following the step 114 is a test step 116 to determine if the user has pressed the "1" key to order an additional form. If so, then control transfers from the test step 116 back to the step 90 where the user is prompted to enter another three-digit form number. Otherwise, if it is determined at the test step 116 that the user does not wish to order an additional form, then control transfers from the test step 116 to additional steps shown in a subsequent figure and indicated on FIG. 3 by the off-page connector "C" 112.

Figure 4:
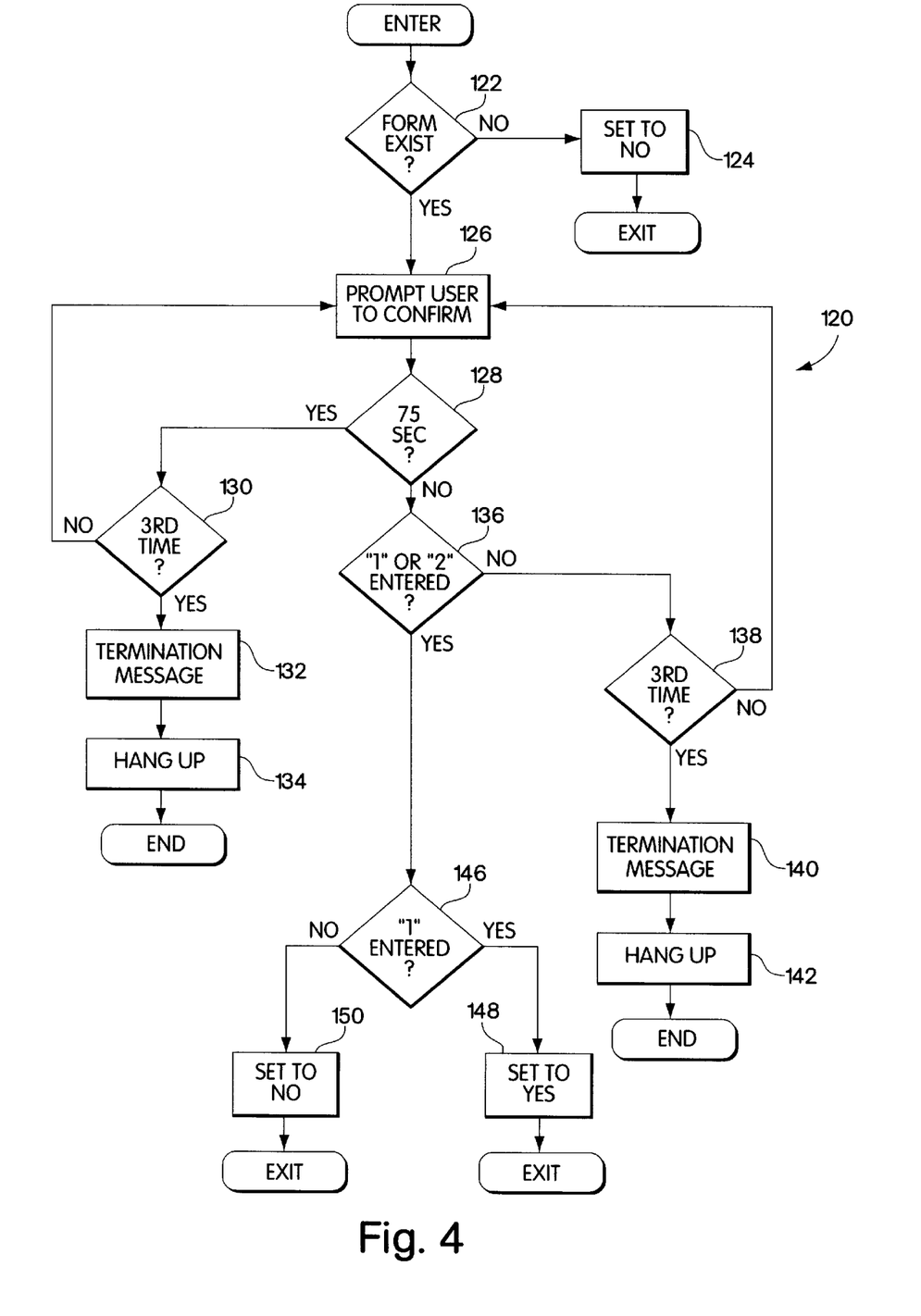
FIG. 4 is a flow chart showing in detail a step of verifying a form number entered by a user.

Referring to FIG. 4, a flow chart 120 indicates substeps which comprise the test step 102 of FIG. 3 that determines if the user has entered a correct form number. The first step of the flow chart 120 is a test step 122 which determines if the form digits entered by the user correspond to an actual form stored in the database of the system 20. If not, then control transfers from the step 122 to a step 124 which indicates that the result of the correct form test at the step 102 will be NO. Following the step 124, processing for the test step 102 is complete and processing resumes at the step 104 shown in FIG. 3.

If at the test step 122 it is determined that the form number entered by the user exists (i.e., the form number corresponds to a form stored in the database of the system 20), then control transfers from the test step 122 to a step 126 where the user is prompted to confirm the form numbers entered by the user. The prompt message indicates the entered form number to the user and asks the user to press a "1" touchtone telephone key to confirm the entry and to press a "2" touchtone telephone key to change the entry. Following the step 126 is a test step 128 which determines if the user has delayed making a key entry for more than five seconds. The user is required to press the "1" or "2" touchtone keys within five seconds of the end of the prompt provided at the step 126. If it is determined at the step 128 that the delay has been greater than five seconds, control transfers from the step 128 to a test step 130 to determine if the user has delayed three times in pressing a key. If not, control transfers from the test step 130 back to the step 126 to reprompt the user to confirm the form order. Otherwise, if the user has been prompted three times at the step 126 and has failed to provide any entries, then control transfers from the step 130 to a step 132 where the user is provided with a termination message indicating that the system 20 is disconnecting due to the user's inaction. Following the step 132 is a step 134 where the system 20 hangs up the telephone. Processing is complete after execution of the step 134.

If it is determined at the step 128 that the user has not delayed key entry for more than five seconds, control transfers from the step 128 to a test step 136 to determine if the user has pressed the "1" touchtone key or the "2" touchtone key in response to the prompt provided at the step 126. Note that only the "1" key and the "2" touchtone keys are the only appropriate responses to the prompt provided at the step 126 (in addition to the "9" key, discussed above in connection with FIG. 2). If it is determined at the step 136 that the user has not pressed the "1" key or the "2" key, then control transfers from the step 136 to a step 138 to determine if the user has provided inappropriate input three times. If not, control transfers from the test step 138 back to the step 126 to reprompt the user to confirm the form order number. Otherwise, if at the step 138 it is determined that the user has provided an inappropriate response three times, then control transfers from the step 138 to a step 140 where the user is provided with a termination message indicating that the system 20 is disconnecting due to the user's inappropriate input. Following the step 140 is a step 142 where the system 20 disconnects from the user by hanging up. Processing is complete after the step 142.

If it is determined at the test step 136 that the user has pressed the "1" touchtone key or the "2" touchtone key, then control passes from the step 136 to a test step 146 to determine if the user has pressed the "1" touchtone key. If the user has pressed the "1" key in response to the prompt at the step 126, then control passes from the step 146 to a step 148 where the result of confirming the form entry is set to YES. That is, the step 148 causes the test step 102 of FIG. 3 to take the YES branch, thus indicating that the form number entered by the user is correct. Following the step 148, control returns to the flow diagram of FIG. 3 where control passes from YES branch at the step 102 to the step 110.

If at the test step 146 it is determined that the "1" key has not been pressed, then control passes from the step 146 to a step 150 where the result of checking the correctness of the form entry is set to NO. That is, the step 150 causes control to pass from the test step 102 of FIG. 3 via the NO branch thereof to the test step 104.

Figure 5:
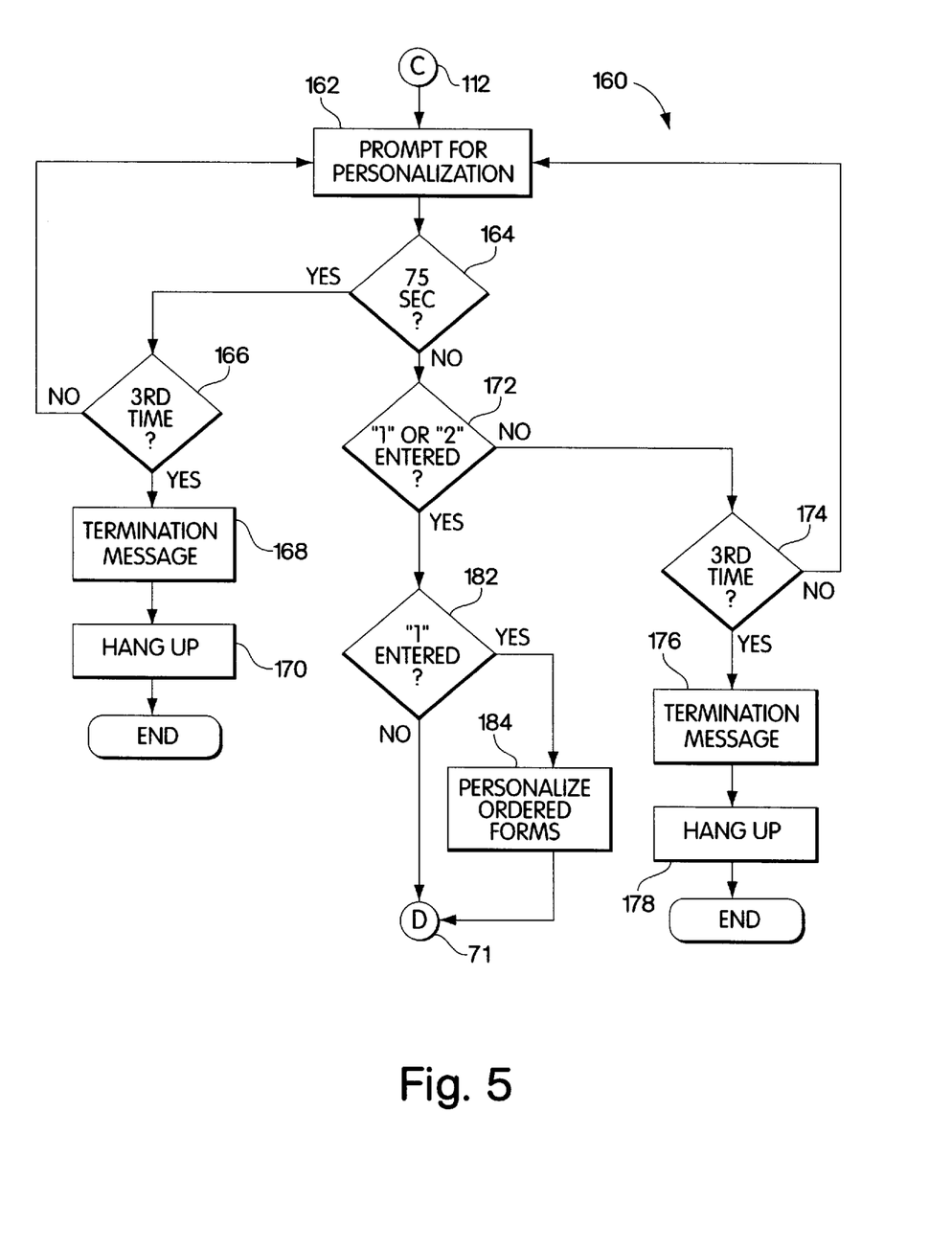
FIG. 5 is a flow chart illustrating steps for customizing user forms.

Referring to FIG. 5, a flow chart 160 shows continued processing from the off-page connector "C" 112 of FIG. 3. The processing begins at a step 162 where a prompt is provided to determine if the user desires to have the forms personalized. Personalizing the forms includes taking existing, generic, blank forms and filling in some of the fields with information from the user profile data that is provided to the system 20. This information includes the user's name, address, telephone number, age, and any other information that can be maintained in the database. Personalizing the forms is accomplished using built-in features of the Jetforms software that merge database information with form images to customize the forms with specific user information.

At the step 162, the user is prompted to press the "1" key on the touchtone telephone to request personalized forms and to press the "2" key on the touchtone telephone to request generic, blank, forms. Following the step 162 is a test step 164 which determines if there is a greater than five-second delay between the end of the prompt at the step 162 and the user entering or pressing a key of the touchtone telephone. If there is a greater than five-second delay, then control passes from the step 164 to a test step 166 to determine if it is the third time that the user has delayed more than five seconds to provide an entry in response to the prompt at the step 162. If it is determined at the step 166 that it is not the third time, then control transfers from the step 166 back to the step 162 to reprompt the user. Otherwise, if it is determined at the test step 166 that the user has provided no response to the prompt at the step 162 three times, then control transfers from the step 166 to a step 168 where the user is provided with an appropriate termination message indicating that the system 20 is disconnecting due to the user's failure to respond to the prompt at the step 162. Following the step 168 is a step 170 where the system 20 hangs up the telephone. Processing is complete after the step 170.

If it is determined at the test step 164 that the user has provided an input within five seconds of the prompt at the step 162, then control transfers from the step 164 to a test step 172 to determine if the user has pressed the "1" key or the "2" key on the touchtone telephone. Note that the only appropriate responses to the prompt at the step 162 are the "1" key and the "2" key (in addition to the "9" key, discussed above in connection with FIG. 2).

If it is determined at the test step 172 that the user has not pressed either the "1" key or the "2" key, then control transfers from the step 172 to a test step 174 to determine if the user has provided an inappropriate response to the prompt at the step 162 three times. If not, then control transfers from the step 174 back to the step 162 where the user is reprompted. Otherwise, if the user has provided an inappropriate response to the prompt at the step 162 three times, then control transfers from the step 174 to a step 176 where the user is provided with an appropriate termination message indicating that the system 20 is disconnecting the user's call due to the inappropriate input provided by the user. Following the step 176 is a step 178 where the system 20 hangs up the call. Processing is complete after the step 178.

If it is determined at the test step 172 that the user has pressed the "1" key or the "2" key on the touchtone telephone, then control transfers from the step 172 to a test step 182 to determine if the user has pressed the "1" key. If so, then control transfers from the test step 182 to a step 184 where personalized information is added to the forms ordered by the user. The forms can be personalized using a run-time version of the Jetforms software running on the IVR processor 24. Following the step 184 or following the test step 182 when the user presses the "2" key, control transfers to an off-page connector "D" 186 which indicates additional processing illustrated in subsequent flow charts and described below.

Figure 6:
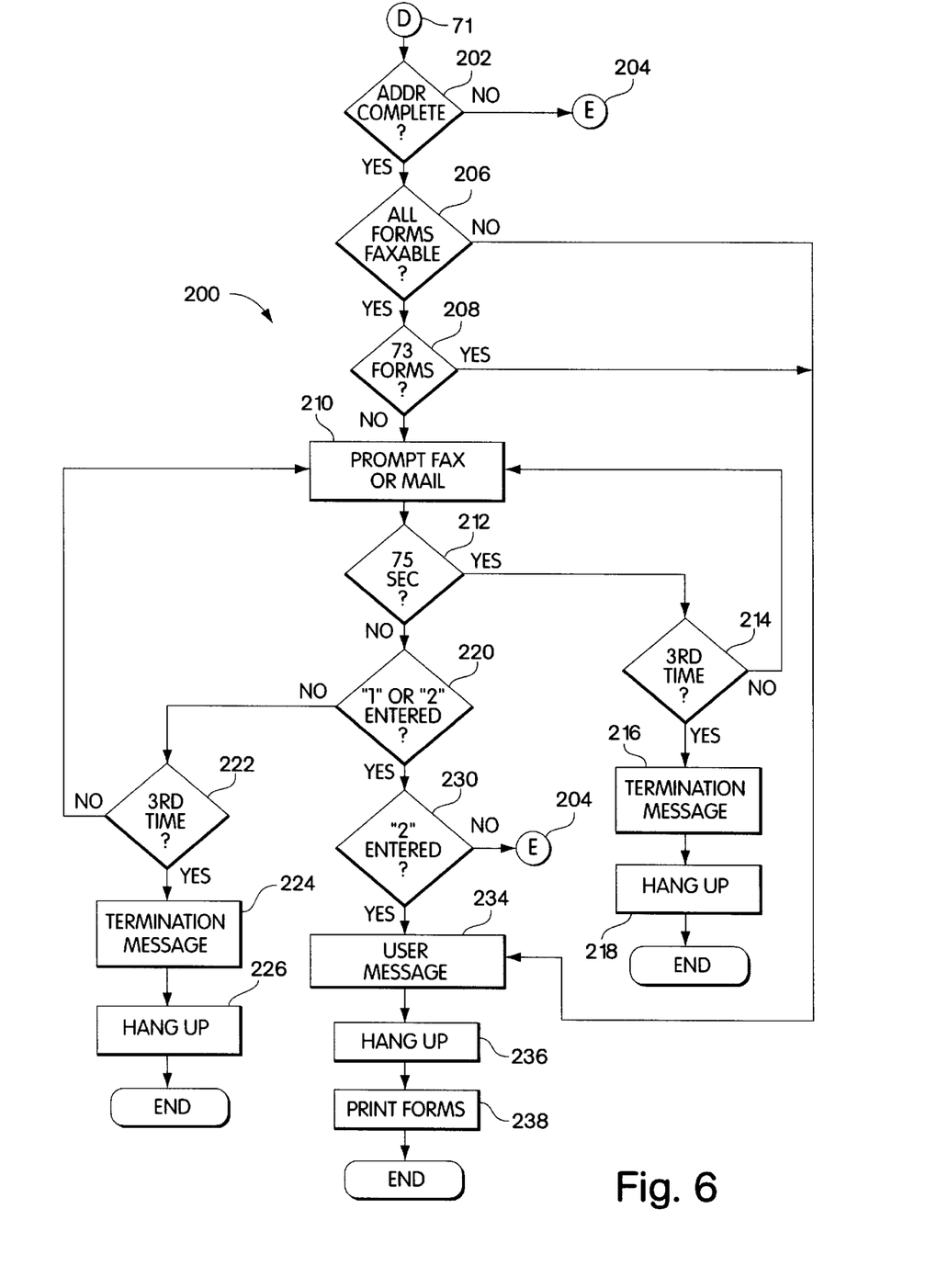
FIG. 6 is a flow chart illustrating steps for determining if forms are to be faxed or mailed to a user.

Referring to FIG. 6, a flow chart 200 illustrates additional steps that follow from the processing of FIG. 5 and continue via the off-page connector "D" 186 of FIG. 5. At a first test step 202, it is determined if the address information for the user that is provided via the user profile data is complete. If so, then control transfers from the test step 202 to additional processing shown in a subsequent figure and indicated by an off-page connector "E" 204. Otherwise, if the address information for the user is complete, then control transfers from the step 202 to a test step 206 to determine if some of the forms ordered by the user are not faxable. Non-faxable forms can include specialized forms that contain carbon pages or other portions which render the forms non-faxable. If all of the forms are faxable, then control transfers from the step 206 to a step 208 to determine if the user has ordered more than three forms. Note that, as discussed above, even if all the forms are faxable, the user is only allowed to fax three forms. Accordingly, if the user has ordered more than three forms, then the ordered forms must be mailed to the user. If the user has not ordered more than three forms, then control transfers from the step 208 to a step 210 where the user is provided with a prompt requesting that the user indicate whether to fax or mail the ordered forms. The prompt at the step 210 indicates that the user should press the "1" touchtone telephone key to have the forms faxed to the user and that the user should press the "2" touchtone telephone key if the user would like the forms mailed.

Following the step 210 is a test step 212 which determines if the user has taken more than five seconds to provide a response to the prompt at the step 210. If so, control transfers from the test step 212 to a test step 214 to determine if it is the third time in a row that the user has failed to respond to the prompt at the step 210 within five seconds. If not, then control transfers from the test step 214 back to the step 210 where the user is reprompted. If, on the other hand, it is determined at the test step 214 it is determined that the user has failed three times to respond to the prompt at the step 210, then control transfers from the step 214 to a step 216 where the user is provided with an appropriate termination message indicating that the system 20 is disconnecting due to the user's inability to respond to the prompt at the step 210. Following the step 216 is a step 218 where the system 20 hangs up the telephone. Processing is complete after the step 218.

If the user enters a response to the prompt at the step 210 within five seconds, then control transfers from the step 212 to a test step 220 which determines if the user has pressed the "1" touchtone telephone key or the "2" touchtone telephone key. Note that the only appropriate responses to the prompt at the step 210 is the "1" key or the "2" key (in addition to the "9" key, discussed above in connection with FIG. 2). If the user has not entered an appropriate response, then control transfers from the step 220 to a test step 222 to determine if the user has entered an inappropriate response three times in response to the prompt at the step 210. If not, then control transfers from the step 222 back to the step 210 to reprompt the user for input. Otherwise, if the user has provided an inappropriate response three times, then control transfers from the step 222 to a step 224 where the user is provided with an appropriate termination message indicating that the system 20 is disconnecting due to the user's inability to provide the requested input. Following the step 224 is a step 226 where the system 20 hangs up the call. Following the step 226, processing is complete.

If at the test step 220 it is determined that the user has pressed the "1" touchtone key or the "2" touchtone key, then control transfers from the step 220 to a test step 230 to determine if the user has pressed the "2" touchtone key indicating a desire that the forms be mailed. If not, then control transfers from the test step 230 to a plurality of steps found in a subsequent flow chart, described below, indicated by the off-page connector "E" 204. Otherwise, if the user requests that the forms be mailed, then control transfers from the step 230 to a step 234 where the user is provided with a message indicating that the forms will be mailed. Following the step 234 is a step 236 where the system hangs up in order to disconnect the call from the user. Following the step 236 is a step 238 where the system 20 prints the forms. The forms are mailed to the user by an operator of the system 20 sometime afterward.

Note that if it is determined at the test step 206 that some of the forms ordered by the user are not faxable or if it is determined at the test step 208 that the user has ordered more than three forms, then control transfers from those steps 206, 208 to the step 234 followed by the steps 236, 238, described above, which causes the forms to be mailed.

Figure 7:
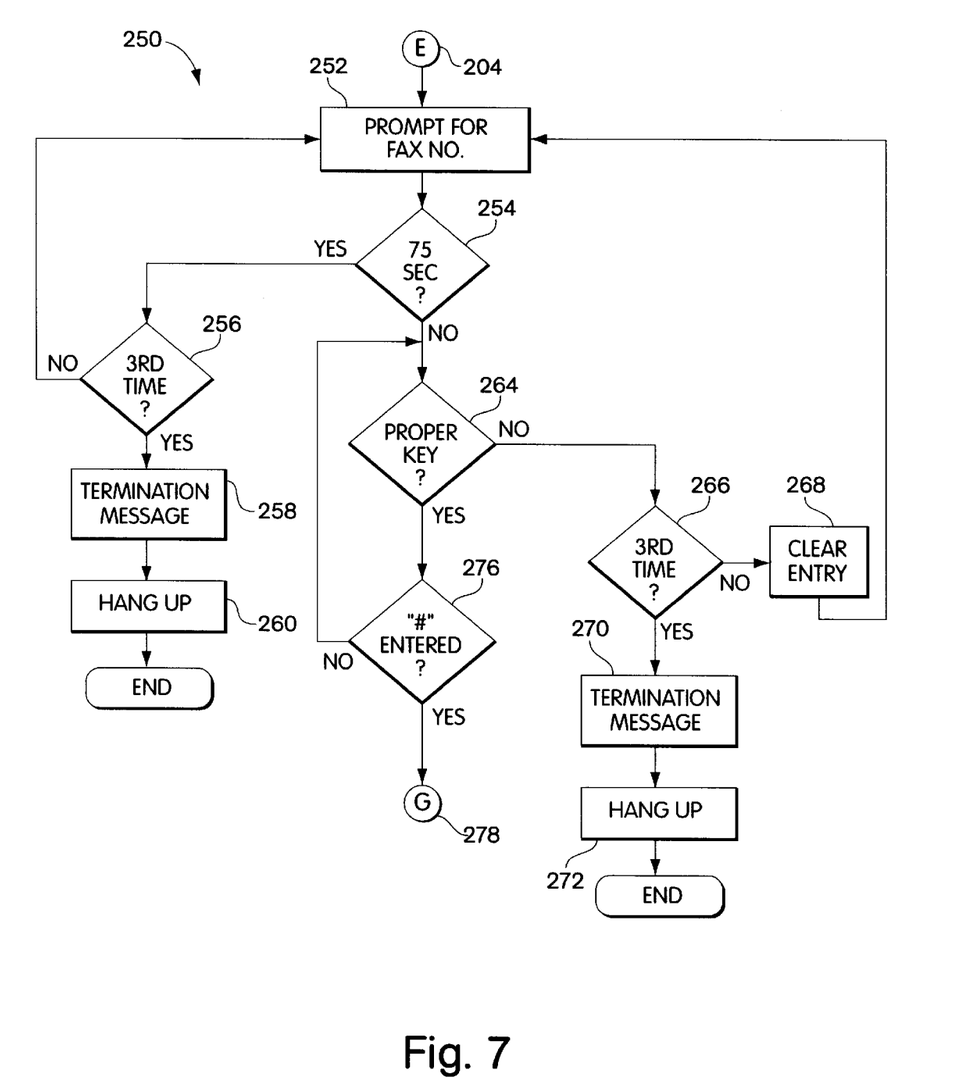
FIG. 7 is a flow chart illustrating steps for prompting and obtaining a telephone fax number from a user.

Referring to FIG. 7, a flow chart 250 illustrates continued operation from the off-page connector "E" 204 of FIG. 6. At a first step 252, the user is prompted to enter the user's fax telephone number. The prompt requests that the user enter all of the digits of the fax telephone number followed by the pound sign.

Following the step 252 is a test step 254 which determines if more than five seconds have passed since the end of the prompt and before the user has entered any digits. If more than five seconds have passed, control passes from the test step 254 to a test step 256 to determine if it is the third time in a row that the user has provided no input in response to the prompt at the step 252. If not, then control passes from the test step 256 back to the step 252 to reprompt the user. Otherwise, if it is determined at the step 256 that the user has not provided any input three times, then control passes from the step 256 to a step 258 where the user is provided with a termination message indicating that the system 20 is disconnecting due to the user's failure to provide input to the prompt at the step 252. Following the step 258 is a step 260 where the system 20 hangs up the telephone connector. Following the step 260, processing is complete.

If at the test step 254 it is determined that the user has provided an input within five seconds, then control passes from the step 254 to a test step 264 to determine if the user has entered a proper key from the user's touchtone telephone. In this instance, the proper keys include all of the number keys and the pound sign ("#"). Note also that pressing the "9" key at this stage will not return the user to the main message at the step 54 shown in FIG. 2. If the user has not entered a proper key, control transfers from the test step 264 to a test step 266 which determines if the user has entered an improper key three times in a row. If not, control transfers from the step 266 to a step 268 where the previous digits entered by the user are cleared from the memory of the system 20 in order to allow the user to reenter the phone number of the user's fax machine from the beginning of the number. Following the step 268, control transfers back to the step 252 where the user is reprompted.

If at the test step 266 it is determined that the user has entered an improper key three times, control transfers from the test step 266 to a step 270 where the user is provided with an appropriate error message indicating that the system 20 is terminating the connection due to the user's failure to properly enter the correct digits. Following the step 270 is a step 272 where the system 20 hangs up the telephone connection. Following the step 272, processing is complete.

If at the test step 264 it is determined that the user has entered a proper key on the user's touchtone telephone, then control transfers from the test step 264 to a test step 276 to determine if the user has pressed the pound sign to indicate that the user has completed entry of the telephone number of the user's fax machine. If it is determined at the test step 276 that the user has not pressed the pound sign, control transfers back up to the step 264 to allow the user to continue to enter keys and to test each of the keys to determine if each key is a proper key. If, on the other hand, it is determined at the step 276 that the user has entered a pound sign, then control transfers from the step 276 to additional steps represented by an off-page connector "G" 278, which corresponds to steps found in flow charts of subsequent figures and described below.

Figure 8:
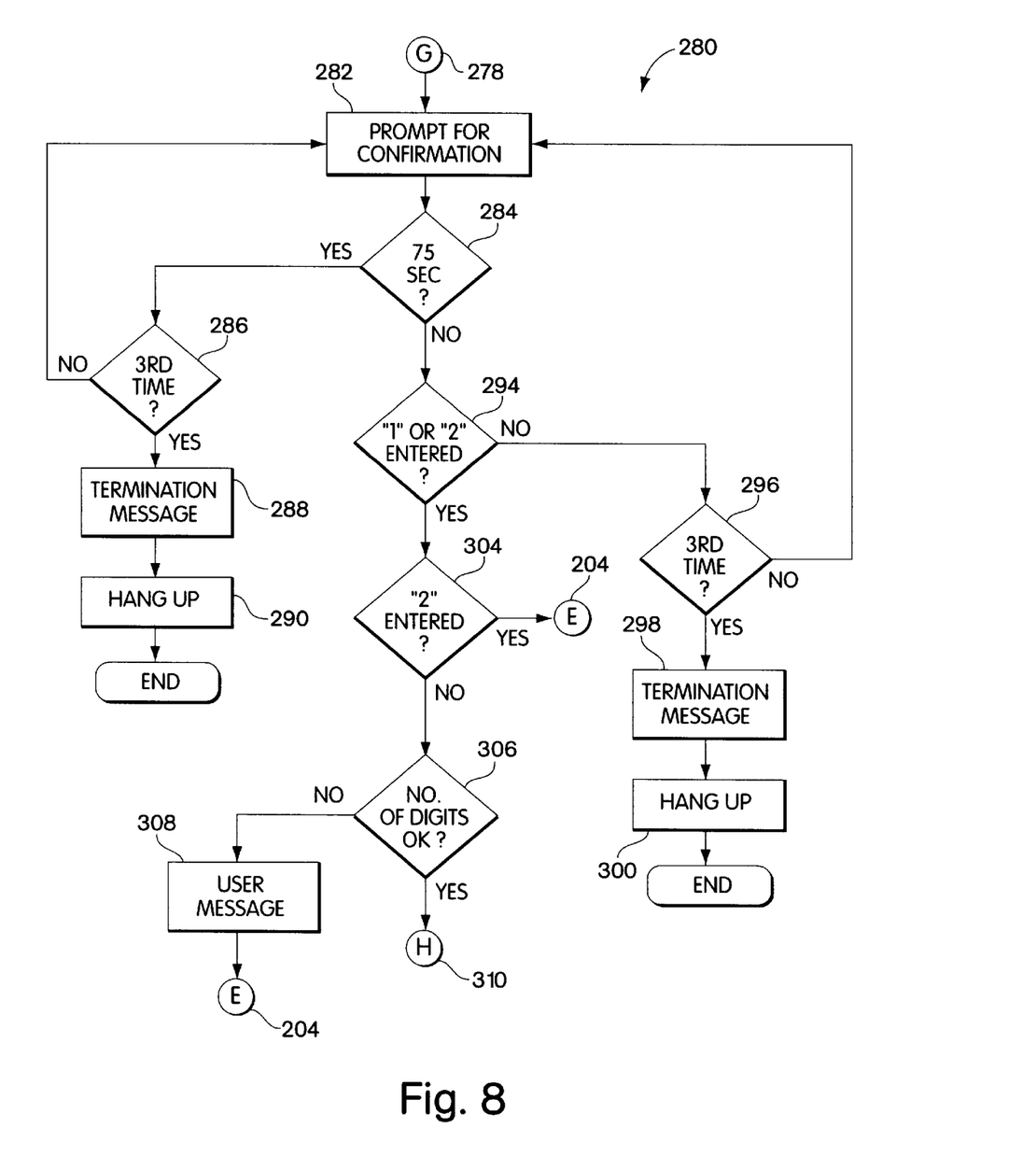
FIG. 8 is a flow chart illustrating steps for confirming a telephone fax number entered by a user.

Referring to FIG. 8, a flow chart 280 represents continuation of steps from the off-page connector "G" 278 of FIG. 7. At a first step 282 of the flow chart 280, the user is prompted to confirm the entered fax telephone number. That is, the user is provided with a message repeating the telephone number entered by the user and requesting that the user confirm that the entered number is correct. The user can confirm entry by pressing the "1" touchtone telephone key. Alternatively, the user can indicate that the telephone entry is incorrect by pressing the "2" touchtone telephone key.

Following the step 282 is a test step 284 which determines if more than five seconds have passed since the end of the prompt at the step 282 until the user has pressed a key of the touchtone telephone. If more than five seconds have passed, then control transfers from the step 284 to a test step 286 which determines if it is the third time in a row that the user has failed to provide input in response to the prompt at the step 282. If not, then control transfers from the step 286 back to the step 282 where the user is reprompted. Otherwise, if it is determined at the step 286 that it is the third time that the user has provided no input in response to the prompt at the step 282, then control transfers from the step 286 to a step 288 where the user is provided with an appropriate termination message indicating that the system 20 is disconnecting due to the user's failure to provide input. Following the step 288 is a step 290 where the system 20 hangs up the telephone. Following the step 290, processing is complete.

If at the step 284 it is determined that more than five seconds have not passed since the user has provided an input in response to the prompt at the step 282, then control transfers from the step 284 to a test step 294 which determines if the user has entered a "1" key or a "2" key on the touchtone telephone. Note that the only appropriate responses to the prompt at the step 282 are the "1" key and the "2" key (in addition to the "9" key which is discussed above in connection with FIG. 2). If it is determined at the step 294 that the user has not provided an appropriate response, then control transfers from the step 294 to a test step 296 which determines if the user has provided inappropriate input in response to the prompt at the step 282 three times. If not, then control transfers from the step 296 back to the step 282 where the user is reprompted to confirm the entered telephone number. Otherwise, if it is determined at the step 296 that the user has provided inappropriate input three times in a row in response to the prompt at the step 282, then control transfers from the step 296 to a step 298 where the user is provided with a termination message indicating that the system 20 is disconnecting due to the user's input of inappropriate data. Following the step 298 is a step 300 where the system 20 hangs up the telephone connection. Following the step 300, processing is complete.

If it is determined at the test step 294 that the user has provided appropriate input in the form of a "1" touchtone telephone key or a "2" touchtone telephone key, then control transfers from the step 294 to a test step 304 which determines if the user has pressed the "2" touchtone telephone key. If so, then control transfers back to the steps indicated by the off-page connector "E" 204 which is found at the top of the flow chart 250 of FIG. 7. The steps of FIG. 7 are directed to allowing the user to re-enter the user's fax telephone number.

If it is determined at the test step 304 that the user has not entered a "2" touchtone telephone key, then control transfers from the step 304 to the step 306. Note that the user reaches the step 306 by passing the "1" key confirming entry of the user's fax telephone number. At the test step 306, it is determined if the telephone number entered by the user contains a correct number of digits. Note that telephone numbers can only contain certain numbers of digits. For example, in the United States, a local telephone number will contain seven digits and a long distance telephone number will contain ten digits. No telephone numbers contain, for example, five or six digits. Accordingly, if it is determined at the step 306 that the user has entered an improper number of digits, control transfers from the step 306 to a step 308 where the user is provided a message indicating that an incorrect number of digits has been received. The message provided at the step 308 also indicates that, for international calls, the telephone number should be preceded by "011". Following the step 308, control transfers to the steps indicated by the off-page connector "E" 204 which is found at the top of the flow chart 250 of FIG. 7.

If it is determined at the step 306 that the user has provided a telephone number with a correct number of digits, then control transfers from the test step 308 to an off-page connector "H" 310 which references steps found in subsequent flow charts and described below.

Figure 9:
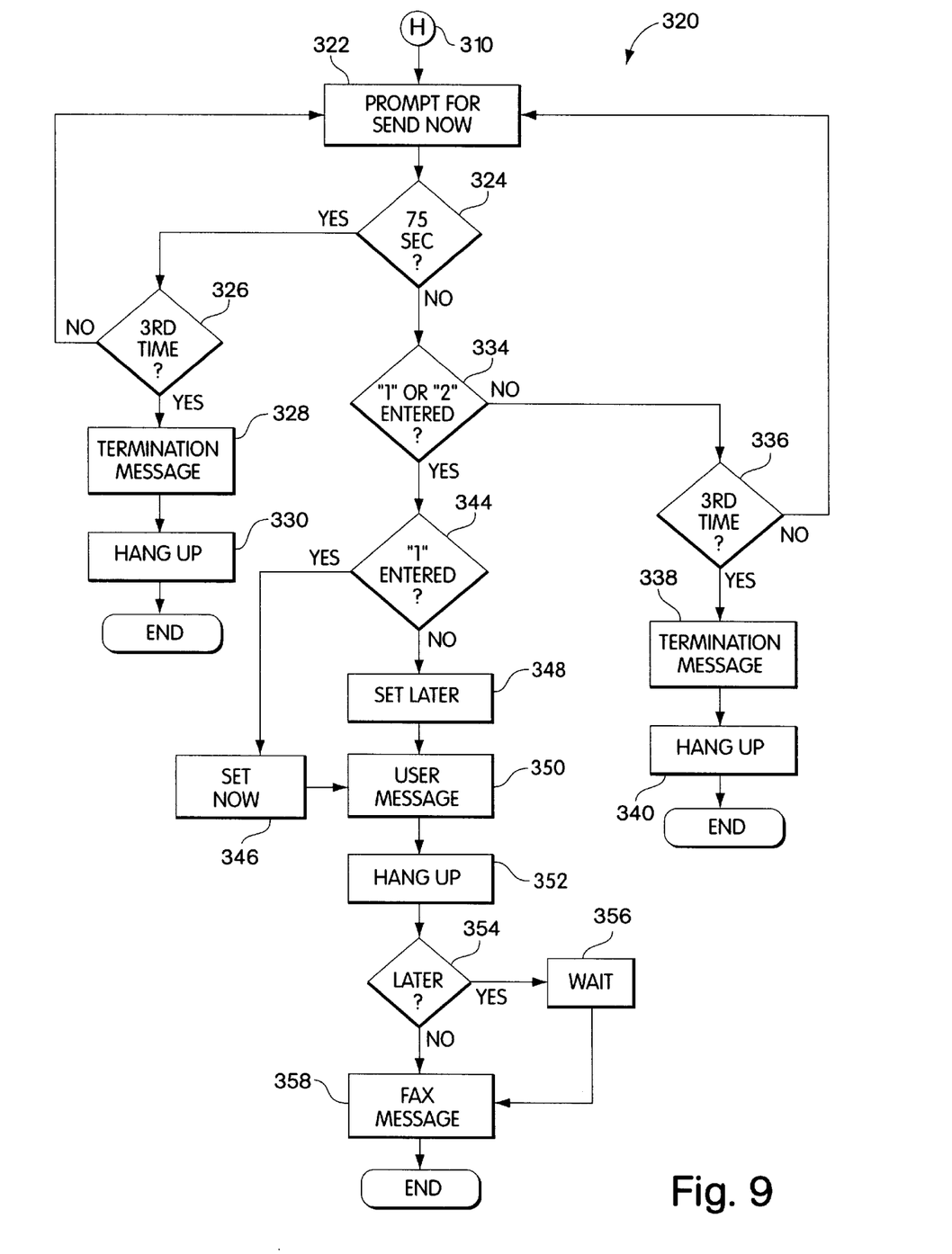
FIG. 9 is a flow chart illustrating final steps for a form creating and ordering system.

Referring to FIG. 9, a flow chart 320 indicates a continuation of steps from the off-page connector "H" 310 found in FIG. 8. At a first step 322, the user is prompted to indicate whether the requested fax transmission should be sent immediately or if the fax transmission of the forms to the user should be delayed until after midnight, Eastern Standard Time. The user is prompted at the step 322 to press the "2" touchtone key to indicate that the user desires to delay fax transmission until after midnight, Eastern Standard Time. The user is also prompted at the step 322 to press the "1" touchtone telephone key to indicate that the user does not desire such a delay. Note that although the system 20 is illustrated herein with a single delay option to midnight, Eastern Standard Time, it is possible to configure the system 20 to allow delay of fax transmission to a different time and/or to allow for multiple delay options and user specified delays.

Following the step 322 is a test step 324 which determines if more than five seconds have passed from the end of the prompt at the step 322 until the user has entered any data. If it is determined at the test step 324 that more than five seconds have passed, then control transfers from the test step 324 to a test step 326 to determine if it is the third time in a row that the user has provided no input in response to the prompt at the step 322. If not, control transfers from the test step 326 back to the step 322 where the user is reprompted. Otherwise, if the user has failed three times in a row to provide input in response to the prompt at the step 322, then control transfers from the step 326 to a step 328 where the user is provided with an appropriate termination message indicating that the system 20 is disconnecting due to the user's inability to enter data in response to the prompt at the step 322. Following the step 328 is a step 330 where the system 20 hangs up the telephone connection, thus terminating the session with the user. Following the step 330, processing is complete.

If at the step 324 it is determined that the user has provided input within five seconds of the end of the prompt at the step 322, then control passes from the step 324 to a test step 334 which determines if the user has entered a "1" touchtone key or a "2" touchtone key in response to the prompt at the step 322. Note that the only appropriate responses to the prompt at the step 322 are pressing the "1" touchtone key or the "2" touchtone key (in addition to the "9" touchtone telephone key, discussed above in connection with FIG. 2).

If it is determined at the step 334 that the user has not provided an appropriate response to the prompt at the step 322, then control transfers from the step 334 to a step 336 to determine if it is the third time in a row that the user has provided an inappropriate response to the prompt at the step 322. If not, control transfers from the step 336 back to the step 322 where the user is reprompted. Otherwise, if it is determined at the step 336 that the user has provided inappropriate input three times, then control transfers from the step 336 to a step 338 where the user is provided with a termination message indicating that the system 20 is disconnecting due to the user's inability to respond appropriately to the prompt at the step 322. Following the step 338, control transfers to a step 340 where the system 20 hangs up the telephone connection. Following the step 340, processing is complete.

If it is determined at the test step 334 that the user has pressed a "1" touchtone key or a "2" touchtone key, then control transfers from the step 334 to a test step 344 to determine if the user has pressed a "1" key. If it is determined at the test step 344 that the user has pressed the "1" touchtone key, control transfers from the step 344 to a step 346 where an indication (such as a software variable) is set to indicate to the system 20 that the forms are to be faxed as soon as possible. Otherwise, if it is determined at the test step 344 that the user has not pressed the "1" key, and thus by inference the user has pressed the "2" touchtone key, then control transfers from the test step 344 to a step 348 where the system 20 is configured to fax the forms after midnight, Eastern Standard Time.

Following either the step 346 or the step 348 is a step 350 where the user is provided with a message indicating that processing is complete. Following the step 350 is a step 352 where the system 20 hangs up the telephone connection, thus terminating the session with the user. Following the step 352 is a test step 354 which determines if the system 20 has been configured to fax the forms after midnight, Eastern Standard Time. If so, control transfers from the step 354 to a step 356, indicating that the system 20 waits until after midnight to fax forms using the user's fax telephone number entered previously. Otherwise, if it is determined at the test step 354 that the user has not configured the system 20 to fax the forms after midnight, then control transfers from the step 354 to a step 358 where the system 20 faxes the forms to the user. Note that the step 358 also follows the step 356 where the system 20 waits. However, in the case of the system 20 transitioning from the step 354 to the step 356 and then to the step 358, the forms will not be faxed until after the period of waiting at the step 356. Following the step 358, processing for the system 20 is complete.

Note that for the faxing step 358, it is possible in the case of items to be faxed after midnight, Eastern Standard Time, to fax the items in a way that takes into account the fact that when it is midnight, Eastern Standard Time, it is 9:00 p.m. on the west coast. Essentially, all of the computer batch jobs corresponding to items to be faxed at midnight are sorted (using the area codes) such that items destined for the east coast are faxed first, followed by items destined for the mid-west, and then followed by items destined for the west coast. In this way, items are faxed to the later time zones last and, hence, closer to midnight in those time zones.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. Method of creating and ordering forms, comprising:
   generating the forms;
   receiving telephone calls placed by users;
   prompting the users to indicate between one and a predetermined number of particular desired forms;
   prompting the users to indicate a selected mode of delivery;
   uniquely identifying each of the users in order to provide identification information indicative thereof;
   receiving user profile data that varies according to the identification information;
   prompting the users to indicate whether the desired forms should be customized prior to being provided to the users;
   customizing the desired forms in response to the users indicating that the desired forms should be customized prior to the desired forms being provided to the users by said form providing means, wherein customizing the desired forms includes the step of adding user specific information thereto; and
   providing the desired forms to the users via the selected mode of delivery.

2. Method of creating and ordering forms, comprising:
   generating the forms;
   receiving telephone calls placed by users;
   prompting the users to indicate between one and a predetermined number of particular desired forms;
   prompting the users to indicate a selected mode of delivery;
   uniquely identifying each of the users in order to provide identification information indicative thereof;
   receiving user profile data that varies according to the identification information;
   prompting the users to indicate whether the desired forms should be customized prior to being provided to the users; and
   customizing the desired forms in response to the users indicating that the desired forms should be customized prior to the desired forms being provided to the users, wherein customizing the desired forms includes the step of adding user specific information thereto; and
   providing the desired forms to the users via the selected mode of delivery.

3. Method of creating and ordering forms, according to claim 2, wherein said selected mode is one of: a faxing mode for faxing the desired forms to the users and a mailing mode for mailing the desired forms to the users.

4. Method of creating and ordering forms, according to claim 3, wherein said faxing mode is one of: a first faxing submode for faxing the desired forms immediately and a second faxing submode for faxing the desired forms at a predetermined time.

5. Method of creating and ordering forms, according to claim 4, wherein said predetermined time is midnight, Eastern Standard Time.

6. Method of creating and ordering forms, according to claim 5, wherein said predetermined number varies according to said selected mode.

7. Method of creating and ordering forms, according to claim 6, wherein said predetermined number is six for said mailing mode and wherein said predetermined number is three for said faxing mode.

8. Form creation and ordering system, comprising:
   form generating means, for creating and editing forms;
   telephone access means, for receiving a telephonic communication placed by an user;
   input means, coupled to said telephone access means, for receiving information from the user indicative of at least one form and identifying information of the user;
   form customizing means, for customizing the at least one user indicated form in connection with the identifying information of the user; and
   form providing means for providing the at least one customized user indicated form to the user, wherein prior to the at least one customized user indicated form being provided to the user by said form providing means, the form customizing means customizes the at least one user indicated form by adding information correlated with the identifying information of the user.

9. Form creation and ordering system, comprising:
   form generating means, for creating and editing forms;
   telephone access means, for receiving telephone calls placed by users;
   first prompting means, coupled to said telephone access means, for prompting the users to indicate between one and a predetermined number of particular desired forms and for prompting the users to indicate a selected mode of delivery;
   form providing means, coupled to said form generating means and said first prompting means, for providing the desired forms to the users via the selected mode of delivery;
   identification means, coupled to said telephone access means, for uniquely identifying each of said users and for providing identification information indicative thereof;
   data receiving means, coupled to said identification means, for receiving user profile data that varies according to said identification information;
   second prompting means, for prompting the users to indicate whether the desired forms should be customized prior to being provided to the users; and form customizing means, coupled to said second prompting means, said data receiving means, and said form providing means, for customizing the desired forms in response to the users indicating that the desired forms should be customized prior to the desired forms being provided to the users by said form providing means, wherein customizing the desired forms includes adding user specific information thereto.

10. Form creation and ordering system, comprising:

form generating means, for creating and editing forms;

telephone access means, for receiving telephone calls placed by users;

first prompting means, coupled to said telephone access means, for prompting the users to indicate between one and a predetermined number of particular desired forms;

form providing means, coupled to said form generating means and said first prompting means, for providing the desired forms to the users;

identification means, coupled to said telephone access means, for uniquely identifying each of said users and for providing identification information indicative thereof;

data receiving means, coupled to said identification means, for receiving user profile data that varies according to said identification information;

second prompting means, for prompting the users to indicate whether the desired forms should be customized prior to being provided to the users; and form customizing means, coupled to said second prompting means, said data receiving means, and said form providing means, for customizing the desired forms in response to the users indicating that the desired forms should be customized prior to the desired forms being provided to the users by said form providing means, wherein customizing the desired forms includes adding user specific information thereto.

11. Form creation and ordering system, according to claim 10, wherein said form providing means includes a fax server and a printer.

12. Form creation and ordering system, according to claim 10, wherein said form generating means includes a scanner.

13. Form creation and ordering system, according to claim 10, wherein said selected mode is one of: a faxing mode for faxing the desired forms to the users and a mailing mode for mailing the desired forms to the users.

14. Form creation and ordering system, according to claim 13, wherein said faxing mode is one of: a first faxing submode for faxing the desired forms immediately and a second faxing submode for faxing the desired forms at a predetermined time.

15. Form creation and ordering system, according to claim 14, wherein said predetermined time is midnight, Eastern Standard Time.

16. Form creation and ordering system, according to claim 15, wherein said predetermined number varies according to said selected mode.

17. Form creation and ordering system, according to claim 16, wherein said predetermined number is six for said mailing mode and wherein said predetermined number is three for said faxing mode.

18. Form creation and ordering system, according to claim 13, wherein said predetermined number varies according to said selected mode.

19. Form creation and ordering system, according to claim 18, wherein said predetermined number is six for said mailing mode and wherein said predetermined number is three for said faxing mode.

20. Form creation and ordering system, according to claim 10, wherein said form generating means includes a form generation engine implemented using a processor and form generation software.

21. Form creation and ordering system, according to claim 13, wherein said form generating means includes a form generation engine implemented using a processor and form generation software.

22. Form creation and ordering system, according to claim 17, wherein said form generating means includes a form generation engine implemented using a processor and form generation software.

23. Form creation and ordering system, according to claim 10, wherein said telephone access means includes a security processor.

24. Form creation and ordering system, according to claim 13, wherein said telephone access means includes a security processor.

25. Form creation and ordering system, according to claim 17, wherein said telephone access means includes a security processor.

26. Form creation and ordering system, according to claim 10, wherein said first prompting means includes an IVR processor.

27. Form creation and ordering system, according to claim 13, wherein said first prompting means includes an IVR processor.

28. Form creation and ordering system, according to claim 17, wherein said first prompting means includes an IVR processor.

29. Form creation and ordering system, according to claim 13, wherein said form generating means includes a scanner.

30. Form creation and ordering system, according to claim 13, wherein said form providing means includes a fax server and a printer.

31. Form creation and ordering system, according to claim 17, wherein said form providing means includes a fax server and a printer.

32. Form creation and ordering system, according to claim 17, wherein said form generating means includes a scanner.

33. Form creation and ordering system, according to claim 22, wherein said telephone access means includes a security processor.

34. Form creation and ordering system, according to claim 33, wherein said first prompting means includes an IVR processor.

35. Form creation and ordering system, according to claim 34 wherein said form providing means includes a fax server and a printer.

36. Form creation and ordering system, according to claim 35, wherein said form generating means includes a scanner.

* * * * *